US006983223B2

(12) United States Patent
Schuh

(10) Patent No.: US 6,983,223 B2
(45) Date of Patent: Jan. 3, 2006

(54) DETECTING THERMOCOUPLE FAILURE USING LOOP RESISTANCE

(75) Inventor: William C. Schuh, Delavan, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 58 days.

(21) Appl. No.: 10/425,391

(22) Filed: Apr. 29, 2003

(65) Prior Publication Data

US 2004/0220775 A1    Nov. 4, 2004

(51) Int. Cl.
G06F 11/30    (2006.01)
(52) U.S. Cl. ..................................... 702/185
(58) Field of Classification Search ............. 702/95, 702/185, 133, 130, 45, 54; 324/427, 446, 324/439, 692, 230, 689, 537; 318/245; 701/115; 340/581, 601; 607/17, 29, 33; 606/41; 600/504, 600/439; 435/287; 73/117; 430/115; 438/479; 239/71; 306/72; 705/3; 62/157, 180, 89; 60/285; 703/6; 148/302; 104/480; 356/72
See application file for complete search history.

(56) References Cited

U.S. PATENT DOCUMENTS

| | | | |
|---|---|---|---|
| 4,498,044 A | 2/1985 | Horn | |
| 5,549,280 A | 8/1996 | Kings et al. | |
| 6,017,143 A | 1/2000 | Eryurek et al. | |
| 6,139,180 A | 10/2000 | Usher et al. | |
| 6,344,747 B1 * | 2/2002 | Lunghofer et al. | 324/537 |
| 6,363,330 B1 | 3/2002 | Alag et al. | |
| 6,377,052 B1 * | 4/2002 | McGinnis et al. | 324/446 |
| 6,441,350 B1 | 8/2002 | Stoddard et al. | |
| 6,473,708 B1 * | 10/2002 | Watkins et al. | 702/130 |
| 6,473,710 B1 * | 10/2002 | Eryurek | 702/133 |
| 6,711,531 B1 * | 3/2004 | Tanaka et al. | 703/6 |
| 2003/0216879 A1 * | 11/2003 | Hashemian | 702/95 |

OTHER PUBLICATIONS

"Collaborative Monitoring and Control of Sintering Using a Web-Based Technology", Sanjay Murthy, CompAs Controls, Inc., 2002, pp. 1-15.
"Failure of Sheathed Thermocouples due to Thermal Cycling", R. L. Anderson and R. L. Ludwig, American Institute of Physics, 1982, pp. 939-940.
"Validation Diagnostics for Defective Thermocouple Circuits," R. P. Reed, American Institute of Physics, 1982, 3 pgs.

* cited by examiner

Primary Examiner—Michael Nghiem
Assistant Examiner—Tung S. Lau
(74) Attorney, Agent, or Firm—Harness, Dickey & Pierce, P.L.C.

(57) ABSTRACT

A system and method is presented for detecting the degradation of a thermocouple circuit prior to failure and the prediction of certain impending thermocouple failures. The detection system monitors the loop resistance of the measurement circuit and isolates the heat affected loop resistance changes from the degraded circuit changes. The monitoring circuit is divided into a sheathed portion, generally exposed to the temperature measurement, and an unsheathed portion of the monitoring system generally at ambient temperature. An algorithm is provided for standard instrumentation systems to predict certain types of impending failure in thermocouple temperature measurement circuits. The algorithm essentially compensates the loop resistance measurements by removing the heat affected sheathed portion loop resistance changes computed from the initial unsheathed portion resistance based on manufacturers parameters specific to a thermocouple and an initial loop resistance measurement, leaving only those changes due to degradations in the unsheathed portion of the circuit.

33 Claims, 9 Drawing Sheets

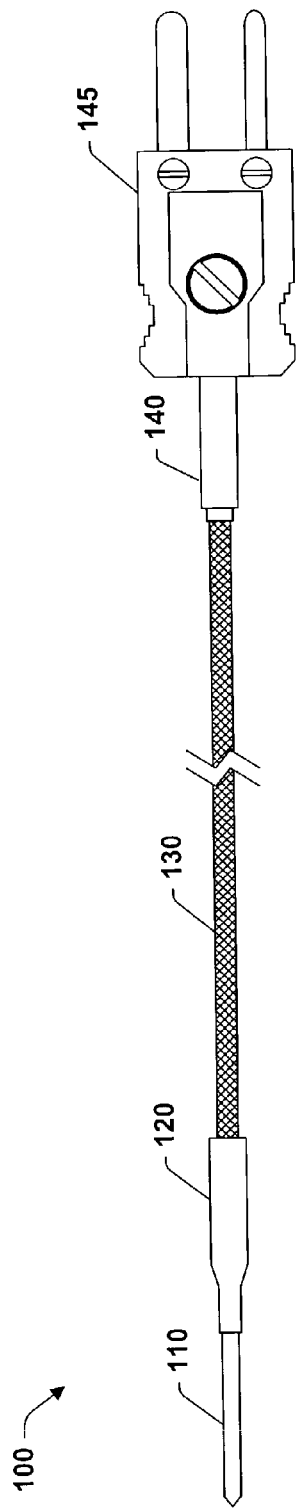
FIG. 1
PRIOR ART
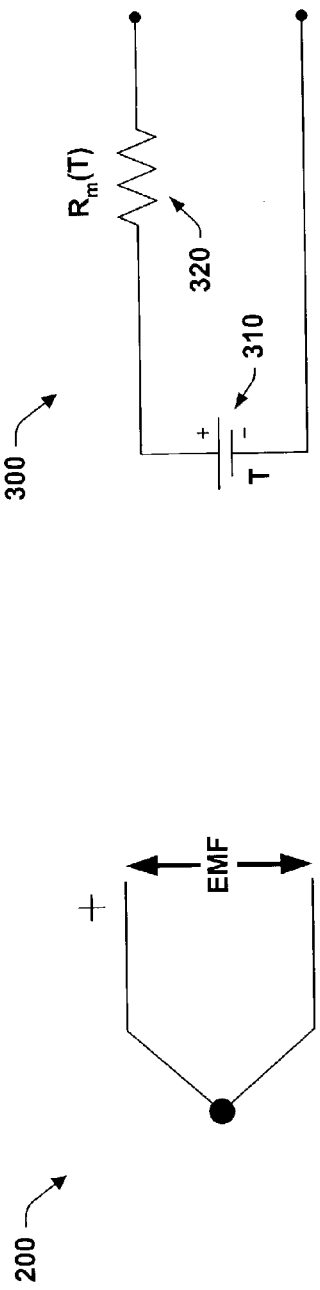
FIG. 3
PRIOR ART
FIG. 2
PRIOR ART

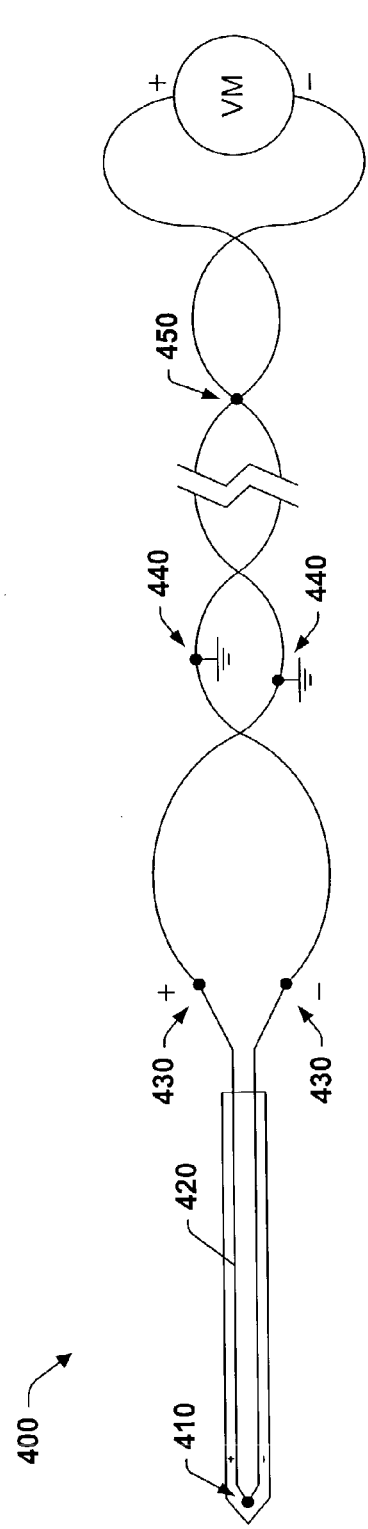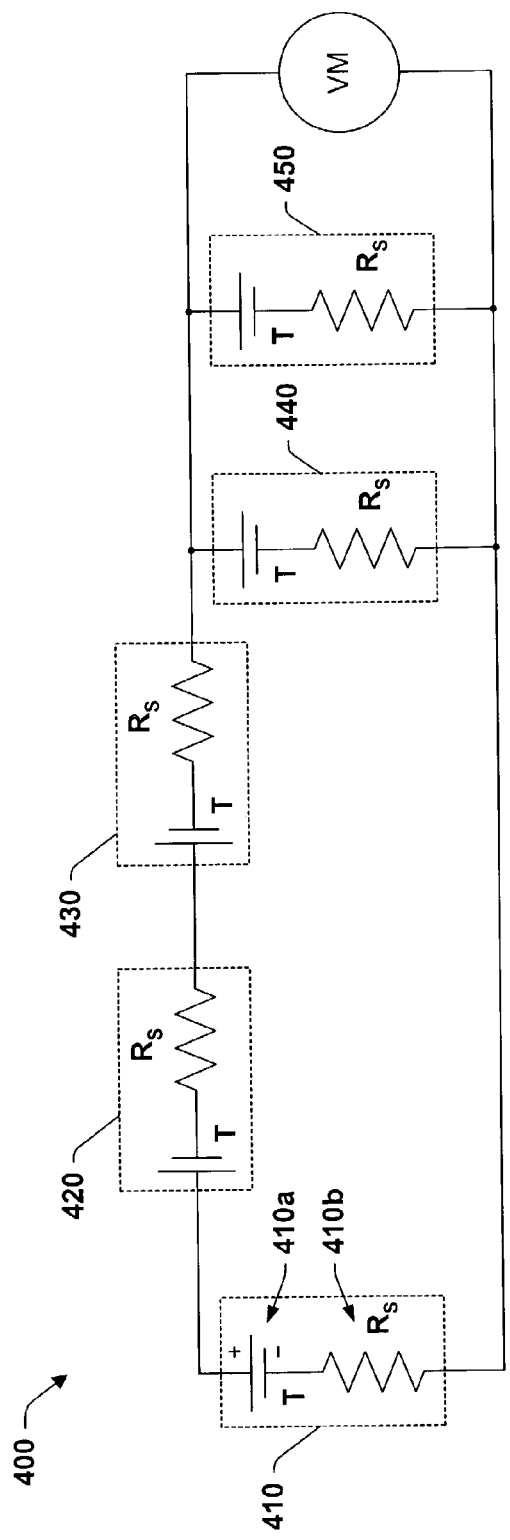
FIG. 4A
FIG. 4B

DETECTING THERMOCOUPLE FAILURE USING LOOP RESISTANCE

FIELD OF INVENTION

The present invention relates generally to thermocouples and more particularly to methods and systems for detecting the degradation of a thermocouple monitoring circuit prior to failure using the loop resistance of the circuit.

BACKGROUND OF THE INVENTION

Temperature measurement is important in many processes. A common method of temperature measurement uses thermocouple transducers that output an EMF in response to a temperature gradient across two dissimilar materials, typically metals. It is well known, however, that thermocouples degrade over time due to chemical and metallurgical changes in the composition of the materials.

Common thermocouples used in temperature measurement comprise two dissimilar thermoelements connected at one end in a hot junction with the other ends connected to the positive and negative leads of a voltmeter at a known reference temperature. The temperature measured at the hot end is a function of the EMF measured and the reference temperature. The thermocouple circuit is typically constructed from conductive metal wires, and the associated loop resistance of the thermocouple monitoring circuit is a measure of the electrical resistance due to the various connections, the resistivity of the wires, and the junction of the materials at the hot junction.

During the use of thermocouples, several forms of degradation take place in the thermocouple circuit including chemical, metallurgical, and mechanical changes in the materials and devices of the circuit. Chemical changes include oxidation of elements in the alloys of the individual thermoelements that, in effect, modify the alloy composition of the base material. The change in chemical composition is usually accompanied by a shift in the resistivity of the thermoelement. Diffusion of the elements may also cause changes in the chemical makeup of the thermoelements and be a source of further resistivity change.

The junction of the two thermoelements is particularly susceptible to chemical changes. The junction is most often the hottest portion of the circuit and is therefore exposed to the harshest conditions. The junction is also exposed to processes that may increase the likelihood of changes in the electrical properties. Welding, soldering, twisting, or crimping, for example, commonly forms the junction of a thermocouple. These joining methods apply a large amount of heat in the case of welding, introduce new materials in the case of soldering, or mechanically strain the materials in the case of twisting or crimping. In these examples the degradation of the junction may be evidenced by an accompanying shift (change) in the loop resistance of the measurement circuit.

Metallurgical changes such as grain growth may also contribute to resistivity changes in the thermoelements. Grain growth, re-crystallization, or annealing is usually accompanied by a change in the resistivity of the material. Finally, severe mechanical damage such as sharp bends, kinks, or indentations can cause a change in the geometry of the thermoelements and the temperature measurement. Mechanical damage and thermal cycling may also change the contact resistance in screw terminals, connectors, or plugs. In these instances the base resistivity of the material is unchanged but the overall loop resistance of the circuit is impacted.

In all of these cases a measurement of the loop resistance of the circuit may help identify degradation of the measuring circuit. The use of impedance measurements on thermocouple circuits have been employed in the past to detect problems in the circuit. In one case, a complex oscillating signal circuit is used to derive the impedance measurement from the thermocouple circuit.

While the prior art has employed the value of loop resistance in determining thermocouple health, accommodations for specific aspects of most practical thermocouple circuits have not been made. For example, in most applications the circuit comprises a portion of the sensor that is exposed to temperature variations along with some leadwire circuitry that is maintained near room temperature. Typically the heat affected region of the circuit is short compared to the total loop length, thus the resistance of the loop is a combination of a large contribution from the leadwire and a smaller contribution from the actual measuring section. Also, since most of the common thermoelement materials have a significant temperature coefficient of resistance, any change in measured temperature will affect the total loop resistance.

Without a method to isolate the changes in loop resistance due to degradation from the effects of temperature change, however, the true health of the thermoelements is difficult to determine with any significant accuracy. Accordingly, there is a need for more accurately detecting the degradation of the thermoelement materials of a temperature monitoring system prior to failure, and for determining the health of the thermocouple and the temperature monitoring system.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a system and method for detecting the degradation of a thermocouple (TC) circuit prior to failure. Changes in loop resistance due to degradation from the effects of temperature change are isolated by identifying the heat affected loop resistance change portion from the total change in loop resistance. A detection system of the present invention monitors the loop resistance of the measurement circuit and isolates the heat affected loop resistance changes from the degraded circuit changes. In one example, the loop resistance of the measurement circuit is isolated by dividing the monitoring circuit into a sheathed portion (e.g., the thermocouple, the portion purchased from the manufacturer), which is generally exposed to the temperature measurements (the heat affected portion), and an unsheathed portion (e.g., connector, lead wires, monitor) that is generally at ambient temperature.

The present invention further provides an algorithm for instrumentation systems to predict certain types of impending failure in thermocouple temperature measurement circuits. The algorithm compensates the loop resistance measurements by removing or isolating out the heat affected sheathed portion loop resistance changes, thus identifying changes due to degradations in the unsheathed portion of the circuit. For example, the algorithm, according to one aspect of the invention, utilizes one or more values supplied by the manufacturer of the thermocouple and an initial loop resistance of the monitoring circuit to isolate the heat affected sheathed portion changes.

For example, an algorithm for computing an initial circuit resistance $R_c$ of the unsheathed portion of a temperature monitoring circuit, based on the loop resistance LR measurement and initial temperature $T_{m0}$ is represented by $R_c = LR - R_{m0}*(1+\alpha/2*(T_{m0}-T_a))$ where $R_{mo}$ is the initial resistance of the sheathed portion of the thermocouple, $\alpha$ is the temperature coefficient of resistance (TCR) of the thermocouple, LR is the measured loop resistance of the thermocouple monitoring circuit measured at the initial indicated temperature $T_{m0}$ with the unsheathed portion of the circuit at an ambient temperature $T_a$. The manufacturer of the thermocouple, for example, may supply $R_{mo}$ and $\alpha$ based on the manufacturer's part number.

Also, an algorithm for computing the thermocouple confidence level % CL in accordance with the present invention, is represented by:

$$\% CL = \{R_{mo}*(1+\alpha/2*(T_m-T_a))-(LR-R_c)\}/(LR-R_c)$$

where $R_{mo}$ is the initial resistance of the sheathed portion of the thermocouple, $\alpha$ is the temperature coefficient of resistance of the thermocouple, LR is the measured loop resistance of the thermocouple monitoring circuit measured at the current indicated temperature $T_m$ with the unsheathed portion of the circuit at an ambient temperature $T_a$. Thus, by applying parameters specific to the thermocouple used in a monitoring system, added accuracy is obtained in determining the source of loop resistance changes or circuit degradation using the algorithms of the present invention. Further, the heat affected sheathed portion and the unsheathed non-heat affected portion of the temperature monitoring system may be isolated and identified for changes and accurately identifying degradation therein, as will be discussed further in conjunction with the method of the present invention.

The TC degradation detection system of the present invention comprises a temperature measuring component, a storage component, and an analyzer comprising an algorithm for predicting certain types of impending failure in thermocouple temperature measurement circuits. The analyzer of the detection system is operable to receive thermocouple parametric input values available from the thermocouple manufacture, monitor one or more sensor (e.g., thermocouple) inputs, monitor the loop resistance of the monitoring circuit, and calculate and store the initial calculation of the non-sheathed resistance of the monitoring circuit to the storage component. In response, the analyzer may then provide one or more of a confidence level, a degradation detection, a failure prediction, and an alarm output, based on an analysis of the thermocouple sheathed portion degradation results from the algorithm.

For example, the detection system may, according to one aspect of the invention, monitor the loop resistance of a thermocouple circuit for changes that are analyzed and determined to be due to a level of thermocouple degradation greater than a predetermined acceptable level. Although only the overall resistance need be monitored, an accurate determination may be made using the algorithm and several parameters of the thermocouple from the manufacturer.

Another aspect of the present invention provides a method for the detection of degradation of thermal elements in the detection system of the invention. The method comprises inputting and storing parametric inputs as provided by the thermocouple manufacturer for the thermocouple that is to be used, then calculating and storing an initial unsheathed portion resistance $R_c$ using the algorithm of the present invention and an initial loop resistance measurement. The method further comprises continuing to monitor the loop resistance, calculating a thermocouple confidence level % CL using the algorithm, the parametric inputs, and the unsheathed portion resistance $R_c$. The thermocouple confidence level % CL may then be used to determine whether an alarm to maintenance should be initiated if the % CL exceeds a predetermined level.

In accordance with another aspect of the invention, by creating a time-series history of periodic thermocouple confidence level % CL calculations, a prediction of an imminent failure, or a prediction of a next expected value may be provided by the detection system.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 1 is a prior art diagram illustrating a conventional thermocouple device as provided by a thermocouple manufacturer such as may be used in a temperature monitoring system;

FIG. 2 is an accompanying schematic symbol of the prior art thermocouple of FIG. 1, and the polarity of an EMF provided by the device;

FIG. 3 is a simplified schematic diagram of an equivalent circuit of the prior art thermocouple of FIG. 1;

FIG. 4A is a diagram illustrating an exemplary wiring diagram of a temperature monitoring system used in accordance with an aspect of the present invention, and demonstrating several potential circuit degradation areas;

FIG. 4B is a schematic diagram of an equivalent circuit of the temperature monitoring system of FIG. 4A in association with an aspect of the present invention;

DETAILED DESCRIPTION OF THE INVENTION

Figure 5A:
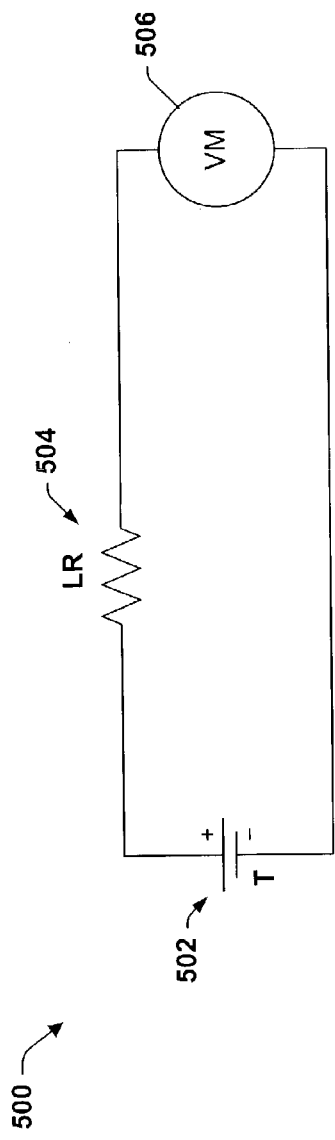
FIG. 5A is a simplified schematic diagram of an equivalent circuit of an exemplary TC degradation detection system of the present invention similar to the temperature monitoring system of FIG. 4A in accordance with an aspect of the present invention.

The present invention will now be described with reference to the attached drawings, wherein like reference numerals are used to refer to like elements throughout. The invention relates to a method of detecting thermocouple degradation in a temperature monitoring system, and a degradation detection system in which an algorithm is employed utilizing several parameters specific to the thermocouples of the monitoring system. The parameters may be supplied by the manufacturer of the specific thermocouples or ascertained in another manner, and are useful for increasing the accuracy of the identification of thermocouple degradation and other elements of the temperature monitoring system. In order to better appreciate one or more features of the invention, several exemplary implementations of the temperature monitoring circuit, the degradation detection system, the degradation detection method, the drift of several TCs, and several types of system outputs is hereinafter illustrated and described with respect to the following figures.

FIG. 1 illustrates a conventional thermocouple device 100, such as may be provided by a thermocouple manufacturer and used in a temperature monitoring system, while FIG. 2 illustrates an accompanying schematic symbol 200 of the thermocouple of FIG. 1. Most common thermocouples are temperature measuring devices or sensors comprising two dissimilar metals connected together at one end, called the hot junction. The two metals have a polarity with respect to each other and one of these is referred to as the positive leg and the other as the negative leg. The two free ends, called the cold end, generate a voltage (EMF) proportional to the temperature difference between the hot end and the cold end.

Referring back to FIG. 1, the conventional thermocouple typically has a stainless steel sheath 110 for protection over the hot junction that may be potted therein (e.g., a ceramic, or epoxy potting material), together with a (e.g., stainless steel) transition 120 to protect the transition to a length of high temperature insulated leadwire 130. The leadwire 130 may also have a length of heatshrink protection and a label 140 before it terminates in a mini-plug connector 145.

FIG. 3 illustrates a simplified schematic diagram 300 of an equivalent circuit of the thermocouple of FIG. 1. The EMF produced by the thermocouple, may be represented by a battery 310 with a temperature dependency, while the total series resistance of the thermocouple device may be represented by $R_m(T)$ 320. Resistance $R_m(T)$ 320, for example, comprises the junction resistance, the lead wire resistance, the leadwire to mini-plug connector resistance, and the resistance of the connector conductors themselves. The manufacturer of the thermocouple in many cases is in possession of some or all the parameters comprising a specific thermocouple device.

A complete circuit (loop) is formed when the two free ends of a thermocouple are connected to a voltage measuring device providing a temperature measurement of the thermocouple hot end. The electrical loop resistance (LR) of the temperature measurement circuit in some cases is an indicator of some forms of impending failure.

Failure of thermocouples can be classified into at least two distinct categories: catastrophic failure and inaccuracy. Catastrophic failures are indicated by a lack of signal from the sensor and can include wire breaks and mechanical damage. Inaccuracies in some cases are more sinister and can result from chemical or metallurgical changes in the thermocouple metals. Inaccuracies can also result from secondary junctions in regions of low electrical insulation isolation between the positive and negative legs away from the hot end. Either of these modes of failure can lead to poor thermal processing in applications, thus it is desirable to avoid unplanned thermocouple failure. One method of minimizing the number of unplanned failures is through a program of preventive maintenance where sensors are replaced at a predetermined interval. Another method is to actively monitor the health of the installed sensor and to replace the sensor when it shows signs of deteriorating performance. There are manual methods of doing so but these require expensive maintenance service and process disruption. The present invention provides one such method and system for predicting impending failure automatically and without disrupting service.

The failure prediction algorithm of the present invention utilizes a shift (change) in the electrical loop resistance of the thermocouple measurement circuit to predict impending thermocouple failure. In a typical thermocouple installation there are several modes of failure but four modes are somewhat common. These common failure modes are:

1) degradation of the weld joining the two metals at the hot end,
2) degradation of either metal leg due to chemical or metallurgical changes occurring at high temperatures,
3) degradation of the electrical connection between the instrumentation to the thermocouple, and
4) secondary junctions caused by degradation of the electrical insulation between the two thermoelements away from the hot end.

FIGS. 4A and 4B, for example, illustrate a wiring diagram and a schematic diagram of an equivalent circuit of an exemplary temperature monitoring system 400 used in accordance with an aspect of the present invention, and for detecting. degradation or failure of a thermocouple. FIGS. 4A and 4B of the temperature monitoring system 400, further demonstrate the four potential circuit degradation areas or failure mechanisms identified above. For example, 410 illustrates the type 1 common failure modes as listed above at the hot end thermoelement junction and any degradations due to the welding/joining process, metallurgical changes, or mechanical damage. Many of the degradation areas herein discussed in the thermoelectric materials will generally demonstrate the effect of a new thermoelement junction comprising a temperature dependant battery and an internal series resistance. For example, FIG. 4B illustrates that the junction degradation area 410 comprises a temperature dependant battery or voltage source 410*a* and an internal series resistance 410*b*. Thus the junction of the thermoelements provides the temperature dependant EMF represented by the temperature dependant battery 410*a*, while the internal resistance of the junction and the materials is represented by internal series resistance 410*b*.

In the same way, the other failure mode or degradation areas are also represented by another temperature dependent voltage source and an internal series resistance. Depending on the actual type of failure mode, the EMF provided by each of these temperature dependant batteries may be quite small, and the internal series resistance may be low, yet at a macroscopic level these characteristics will generally exist. For example, 420 illustrates the type 2 failure mode due to the degradation of either metal leg due to chemical or metallurgical changes occurring at high temperatures, or mechanical damage such as dents or pinching of the protective sheath. Region 430 illustrates the type 3 failure mode due to the degradation of the electrical connection between the instrumentation and the thermocouple. This failure mode could be in the termination between the leadwires and the mini-plug, between the mini-plug prongs and the mating instrumentation socket, or between the mating instrumentation socket and the leadwires to the instrumentation. Loose connections in this area can cause large loop resistance changes.

The type 4 failure mode is due to secondary junctions caused by degradation of the electrical insulation between the two thermoelements away from the hot end, and is illustrated at 440 and 450. Secondary junction 440 may be caused, for example, by frayed leadwire insulation allowing leadwire conductors to touch a common object such as the electrical conduit for the instrumentation leadwires, or allowing the conductors to touch each other directly at 450. Thus, several series and parallel voltages and resistances may be formed within the temperature monitoring circuit due to the above failure modes. All four of the modes of failure are accompanied by a shift in the electrical loop resistance, LR, of the measurement circuit, as illustrated by a temperature measuring system 500 of FIGS. 5A and 5B in accordance with an aspect of the present invention. FIG. 5A illustrates the temperature dependant voltage source 502 supplying an EMF through loop resistance LR 504 to the instrumentation voltmeter VM 506 for monitoring the temperature at the thermocouple.

LR may be employed as an indicator of the relative health of the thermocouple. Since most commercially available thermocouple measurement instruments also have provisions for making resistance measurements, it is a simple matter to implement a LR monitoring scheme to provide indications of the sensor's health.

LR monitoring provides a means of predicting some modes of impending failure, but it may not detect all modes of failure or detect all instances of the listed four modes. It will however improve the likelihood of detecting a failing thermocouple sensor and thus increase the reliability of the thermal system. A simple scheme of recording the LR history of the sensor will be of some value, but a slightly more sophisticated scheme will give a more robust failure prediction system.

Figure 5B:
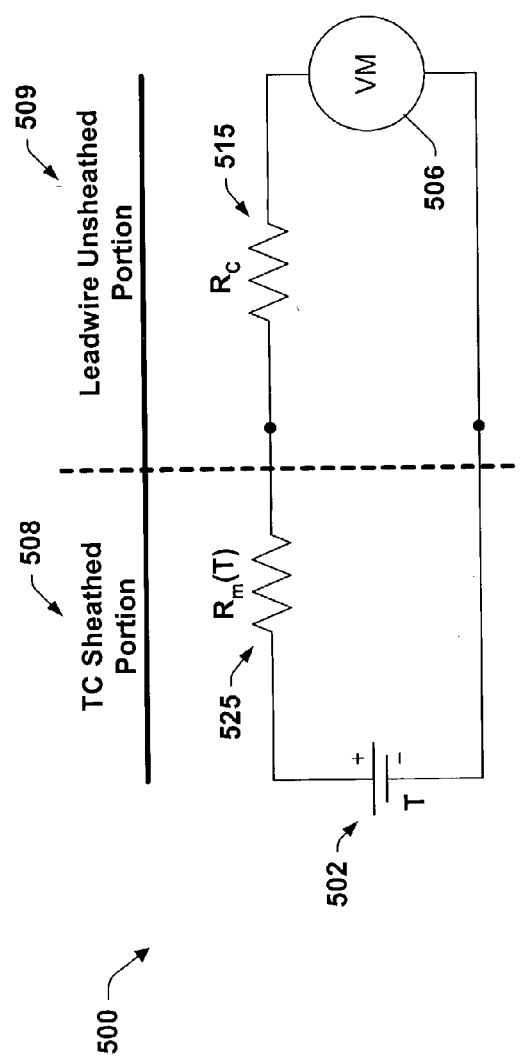
FIG. 5B is a schematic diagram of another equivalent circuit of the exemplary TC degradation detection system of FIG. 5A, illustrating the system divided into sheathed and unsheathed portions in association with an aspect of the present invention, and equations relating to the degradation detection algorithm of the present invention.

As further illustrated by the temperature monitoring system 500 of FIG. 5B, the loop resistance LR 504 comprising the series and parallel voltages and resistances are formed within either the sheathed portion 508 of the thermocouple device or within the unsheathed portion 509 of the temperature monitoring system 500. Generally, failure modes 1 & 2 and some of the mode 3 failures occur within the sheathed portion 508, while the remainder of failure mode 3 and 4 occur within the unsheathed portion 509.

The development of a thermocouple failure detection or thermocouple failure prediction algorithm in accordance with an aspect of the present invention is presented as follows. Consider a typical thermocouple installation (e.g., FIGS. 4A and 4B, or 5A and 5B) consisting of a metal sheathed sensor transitioning to a sheathed portion leadwire and then connected to the instrumentation through an unsheathed portion leadwire circuit. The sensor and its sheathed portion leadwire are supplied from the factory. The unsheathed portion leadwire circuit is provided typically by the customer at the application. The sheathed portion of the sensor is usually exposed to the largest temperature gradient while the unsheathed portion leadwire is exposed typically to temperatures slightly above ambient. Since the resistance of a metal wire increases with temperature one can expect that the loop resistance will have a component that is affected by the installation temperature, but that the unsheathed portion leadwire will, for the most part, remain at a somewhat constant temperature.

Both the sheathed portion leadwire and the sheathed sensor combine to form the measurement circuit and so both must be considered. Because the unsheathed portion leadwire is not in a substantially temperature affected zone, its contribution (to an approximation) to the LR 504 is a constant resistance $R_c$ 515. The sheathed portion resistance can likewise be denoted $R_m(T)$ 525, where the T indicates this is in a temperature affected zone and so will shift in resistance with changing temperature. Now the LR of the system is the sum of constant temperature unsheathed portion leadwire resistance $R_c$ 515 and the heated sensor resistance $R_m(T)$ 525, thus:

$$LR=R_c+R_m(T). \qquad (1)$$

For a metal subjected to a temperature, its resistance will shift from a nominal resistance, $R_0$, depending on the temperature coefficient of resistance (TCR), $\alpha$, and the temperature change, $\Delta T$. Then, $$R=R_0*(1+\alpha*\Delta T). \qquad (2)$$

One might expect $\Delta T$ in equation (2) to be simply the difference $(T_m-T_a)$, where $T_m$ and $T_a$ are the indicated temperature and the ambient temperature (nominally 22° C.) respectively. However, this is not the case, because it is assumed that a linear temperature drop occurs between the hot end $T_m$ and the ambient end of the sheath at $T_a$. Then the average temperature along the sheath would be:

$$T_{avg}=\tfrac{1}{2}*(T_m+T_a).$$

However the temperature change $\Delta T$ is the difference between this average temperature $T_{avg}$ and $T_a$:

$$\Delta T=\tfrac{1}{2}*(T_m+T_a)-T_a=\tfrac{1}{2}*(T_m-T_a). \qquad (2a)$$

Now considering the LR measurement using $R_m(T)$ in the heat affected zone gives:

$$LR=R_c+R_m*(1+\alpha/2*(T_m-T_a)) \qquad (3)$$

Now $R_c$ should be constant throughout the life of the sensor and so only the $R_m*(1+\alpha/2*(T_m-T_a))$ term should change with changing temperature. Then $LR-R_c$ should be equal to, $$LR-R_c=R_m*(1+\alpha/2*(T_m-T_a)), \qquad (4)$$

or $$R_c=LR-R_m*(1+\alpha/2*(T_m-T_a)). \qquad (4a)$$

The degree to which the two terms differ (e.g., the percentage difference) is an indication of the magnitude of the circuit change from the expected loop resistance values. Small deviations can be explained by slight shifts in the ambient temperature or other minor factors, but a large shift could be an indication of a problem in the circuit and thus an indicator of impending failure from one of the four modes of failure listed above.

For example, first level implementation of loop resistance failure prediction includes monitoring the LR of the circuit and logging the values. If the LR shifts outside of some predetermined bounds, then an alarm condition can be signaled and maintenance performed.

A second level implementation further includes a process temperature shift compensation to the algorithm. This would require that some of the values associated with the sensor are pre-registered at the factory and then an initial base point reading be accomplished upon installation. The values registered at the factory include the temperature coefficient of resistance, $\alpha$, of the thermocouple wire that is determined from the thermocouple type and the loop resistance $R_{m0}$, of the sheathed portion of the sensor. Both of these values typically are readily available based upon the sensor part number. Upon installation, an initial LR resistance reading is taken and then $R_c$ is calculated from the initial LR measurement (according to equation (4a) above), the factory values, and the indicated temperature, $T_m$. Then, for example, periodically a LR reading is taken and the loop resistance of the sheathed portion in the heat affected zone is compared to the predicted resistance values using:

$$\% CL = \{R_{m0}*(1+\alpha/2*(T_m-T_a))-(LR-R_c)\}/(LR-R_c). \quad (5)$$

Equation (5) above, provides an algorithm for computing the thermocouple confidence level % CL in accordance with the present invention. If this computed value exceeds some predetermined confidence level limit, then an alarm condition is issued and maintenance may be performed.

In the confidence level % CL algorithm of equation (5), $R_{m0}$ is the initial resistance of the sheathed portion of the thermocouple (e.g., provided by the manufacturer), $\alpha$ is the temperature coefficient of resistance of the thermocouple (e.g., provided by the manufacturer), LR is the measured loop resistance of the thermocouple monitoring circuit measured at the current indicated temperature $T_m$ with the unsheathed portion of the circuit at an ambient temperature $T_a$. As discussed above, the unsheathed constant resistance $R_c$ is calculated from the initial LR measurement (according to equation (4a) above), the factory values, and the indicated temperature, $T_m$. Thus, by applying parameters specific to the thermocouple used in a monitoring system, added accuracy is obtained in determining the source of loop resistance changes or circuit degradation using the algorithms of the present invention. In the algorithm of the present invention, the heat affected sheathed portion and the unsheathed portion of the temperature monitoring system are isolated for accurately identifying degradation changes therein.

Figure 6:
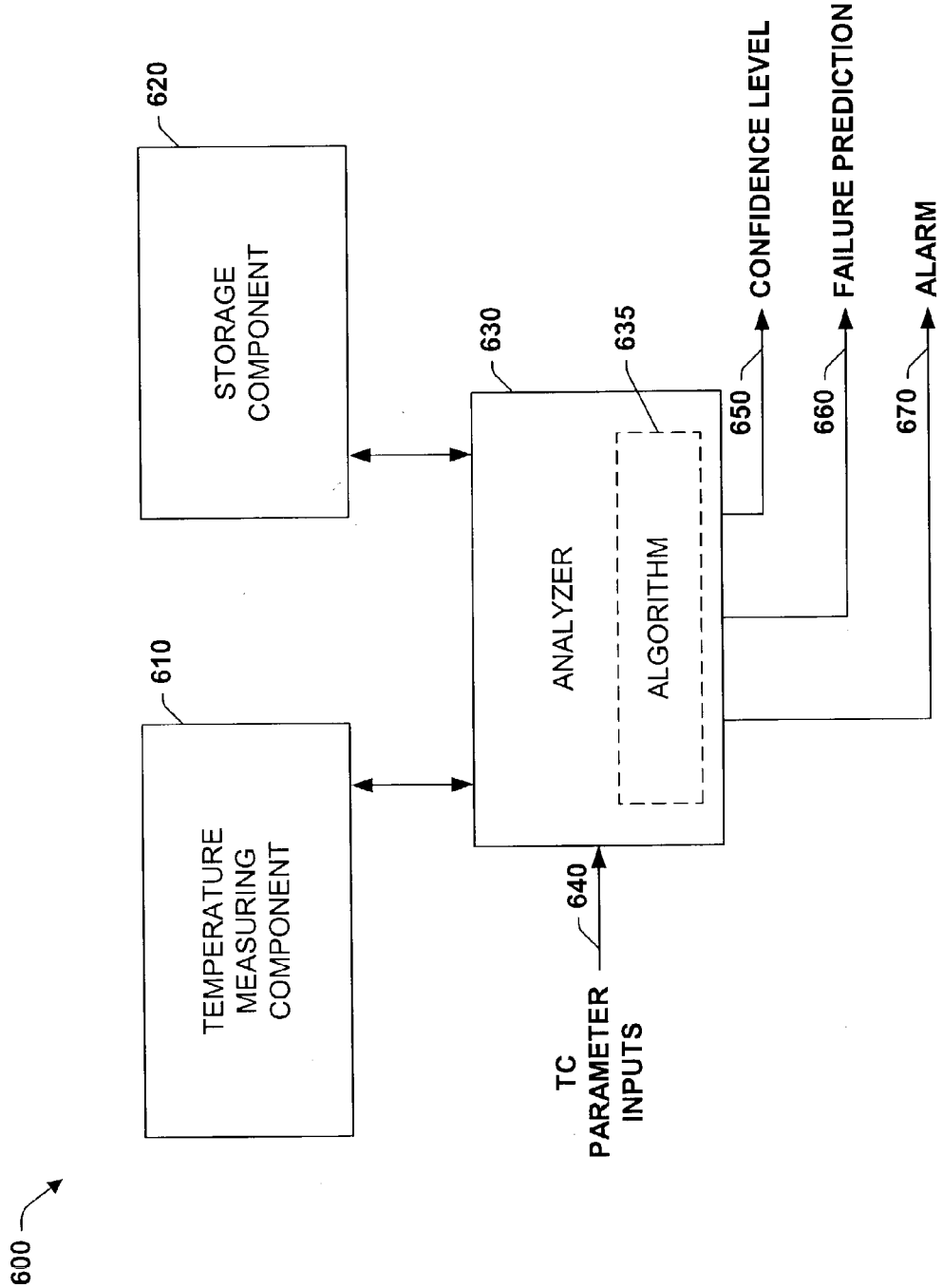
FIG. 6 is a simplified block diagram of an exemplary TC degradation detection system for detecting TC circuit degradations and predicting failures in accordance with an aspect of the present invention.

A thermocouple failure detection system 600 is illustrated in FIG. 6 in accordance with an aspect of the present invention. The detection system 600 comprises a temperature measuring component 610, a storage component 620, and an analyzer 630 having an algorithm 635 used by the analyzer 630 for detecting TC circuit degradations and to make TC failure predictions. The temperature measuring component 610 is operable to monitor one or more thermocouples and the loop resistance of the thermocouple monitoring circuit, and forward the results to the analyzer 630. The analyzer 630 is operable to receive one or more TC parametric inputs 640 (e.g., provided by the manufacturer), and the results of the temperature measuring component 610.

The analyzer 630 of FIG. 6 is further operable to analyze the results of the temperature monitor component 610, and use the algorithm 635 together with the TC parametric inputs 640 to compute and store the unsheathed constant resistance $R_c$ to the storage component 620. The analyzer 630 of the detection system 600 is further operable to direct the measurement component to make additional loop resistance measurements of each TC and to analyze and determine using the failure detection algorithm 635, the confidence level 650 of the TC, make a failure prediction 660 of the TC, and issue an alarm condition 670 if a predetermined limit has been achieved.

Figure 7:
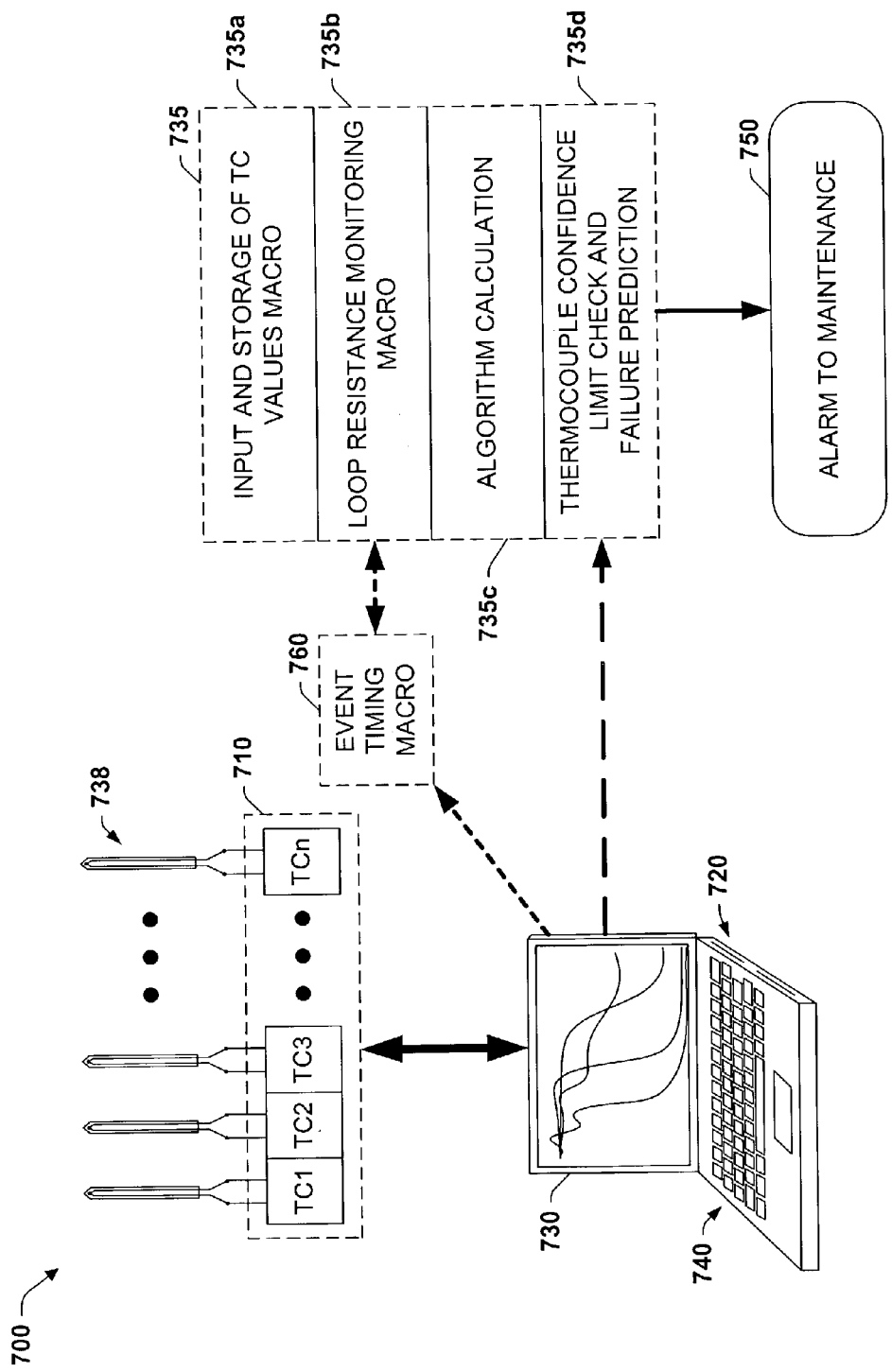
FIG. 7 is a functional diagram of an exemplary TC degradation detection system and illustrating a method for monitoring, analyzing, and detecting TC circuit degradations, and predicting failures in accordance with an aspect of the present invention.

For example, FIG. 7 illustrates one example of a TC degradation detection system 700 for monitoring, analyzing, and detecting TC circuit degradations, and predicting failures in accordance with an aspect of the present invention. The detection system 700 comprises a temperature measuring component 710, a storage component 720, and an analyzer 730 having an algorithm 735 used by the analyzer 730 for detecting TC circuit degradations and to make TC failure predictions. The temperature measuring component 710 is operable to monitor one or more thermocouples 738 and the loop resistance of the thermocouple monitoring circuit, and forward the results to the analyzer 730. The analyzer 730 is operable to receive one or more TC parametric inputs 740 (e.g., provided by the manufacturer), and the results of the temperature measuring component 710.

The analyzer 730 of FIG. 7 is further operable to analyze the results of the temperature monitor component 710, and use the algorithm 735 together with the TC parametric inputs 740 to compute and store the unsheathed constant resistance $R_c$ to the storage component 720. The analyzer 730 of the detection system 700 is further operable to direct the measurement component to make additional loop resistance measurements of each TC and to analyze and determine using the failure detection algorithm 735, the confidence level 735d of the TC, make a failure prediction 735d of the TC, and issue an alarm condition 750 if a predetermined limit has been achieved or exceeded. For example, when a predetermined failure level is reached, maintenance may be alerted to check or replace the thermocouple, or alternatively to check for loose terminal connections or broken leadwires.

In this aspect of the present invention, an event timing macro 760 is further added to control how often the loop resistance measurement is made via a loop resistance monitoring macro 735b. For example, timings ranging from continuous loop resistance measurements to once per day, or once per thermal process cycle may be enabled with the event timing macro 760.

Another aspect of the invention provides a methodology for monitoring, analyzing, and detecting TC circuit degradations, and predicting failures in a thermocouple monitoring system as illustrated and described herein, as well as other types of temperature monitoring systems.

The method relies on a shift in the loop resistance of the measurement circuit as an indicator of sensor health. Increasing or decreasing resistance is an indicator of, for example, weld degradation, metal wire degradation, electrical contact degradation, or formation of secondary junctions. The method compensates for expected resistance variation due to measured temperature variation. The method of the present invention utilizes an algorithm to detect the degradations and to enable failure predictions as described in the algorithm and equation development above.

Figure 8:
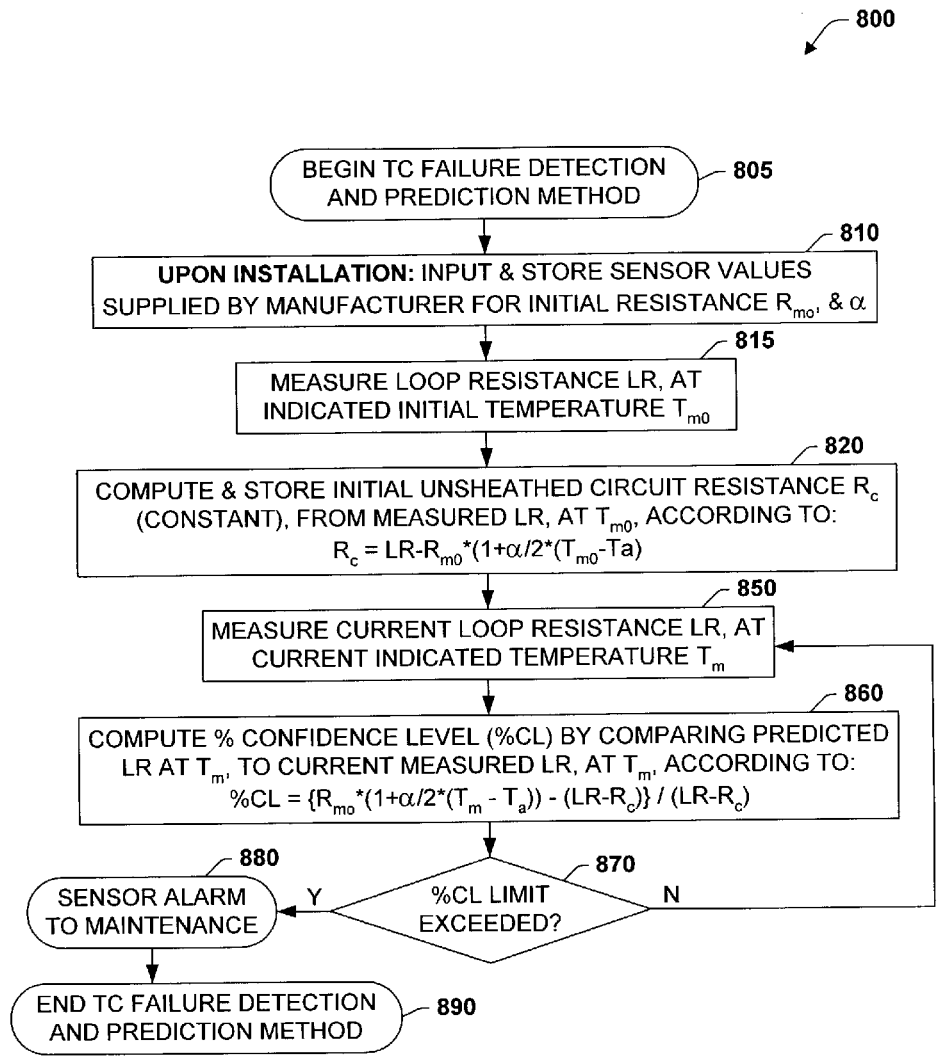
FIG. 8 is a flow chart diagram illustrating a method of detecting TC circuit degradations, and predicting failures in a TC degradation detection system in accordance with an aspect of the present invention.

Referring now to FIG. 8, an exemplary method 800 is illustrated for detecting TC circuit degradations, and predicting failures, for example, in a TC degradation detection system similar to the systems of FIGS. 6 and 7 in accordance with an aspect of the present invention. While the method 800 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 800 according to the present invention may be implemented in association with the detection systems, elements, and devices illustrated and described herein as well as in association with other systems, elements, and devices not illustrated.

The method 800 comprises initially (upon installation) inputting and storing sensor (e.g., thermocouple) specific parameters (e.g., available from the manufacturer by sensor part number) of the initial sensor resistance $R_{m0}$, and the TCR, $\alpha$. A loop resistance LR, is also measured at the indicated initial temperature $T_{m0}$. An initial unsheathed (constant) circuit resistance $R_c$ is then computed according to equation (4a) of the failure detection algorithm, from the measured LR, the sensor specific parameters $R_{m0}$ and $\alpha$, at the indicated initial temperature $T_{m0}$ with the unsheathed portion of the detecting system at an ambient temperature $T_a$. $R_c$ is then stored in memory for future reference.

Later, a currently measured loop resistance LR is taken at a current indicated temperature $T_m$. A confidence level (CL), for example a percentage confidence level (% CL) is computed from the currently measured LR, at $T_m$, thereby comparing the predicted loop resistance values to the currently measured values according to equation (5) of the failure detection algorithm.

Method 800 also includes determining whether the CL has exceeded a predetermined limit. If the limit has not been exceeded, the detection continues to take additional loop resistance LR measurements and compute CL values. When the CL limit has been exceeded a sensor alarm is issued to signal that a failure is imminent, and the method ends.

The exemplary failure detection and prediction method 800 of FIG. 8 begins at 805. Upon installation, initial thermocouple resistance $R_{m0}$, and the TCR, $\alpha$, parameters specific to the thermocouple (e.g., based on the manufacturers part number) are input and stored at 810 in the detection system. At 815, a loop resistance LR, is also measured at an indicated initial temperature $T_{m0}$. An initial unsheathed (constant) circuit resistance $R_c$ is then computed at 820 according to equation (4a) of the failure detection algorithm, from the measured LR, the sensor specific parameters $R_{m0}$ and $\alpha$ at the indicated initial temperature $T_{m0}$ with the unsheathed portion of the detecting system at an ambient temperature $T_a$.

$$R_c = LR - R_m*(1+\alpha/2*(T_m-T_a)). \quad (4a)$$

The unsheathed circuit resistance $R_c$ is then stored in memory for future reference.

At 850, a current loop resistance LR measurement is taken at a current indicated temperature $T_m$. At 860, a confidence level (CL), for example a percentage confidence level (% CL) is computed from the current LR measurement at $T_m$, thereby comparing the predicted loop resistance values to the currently measured values according to equation (5) of the failure detection algorithm.

$$\% CL = \{R_{m0}*(1+\alpha/2*(T_m-T_a))-(LR-R_c)\}/(LR-R_c). \quad (5)$$

Method 800 also includes determining whether the CL has exceeded a predetermined limit at 870. If the limit has not been exceeded, the detection continues to 850 to take additional loop resistance LR measurements and compute CL values. If, however, the CL limit has been exceeded at 870, a sensor alarm is issued at 880 to signal that a failure is imminent.

Thereafter, the failure detection and prediction method of the present invention ends at 890. The method detects TC circuit degradations, and predicts failures in a thermocouple monitoring system as well as other types of temperature monitoring systems, wherein a shift in the loop resistance of the measurement circuit is an indicator of sensor health. Thus, the present invention provides compensation for expected resistance variation due to measured temperature variation, utilizing a failure detection algorithm to detect thermocouple degradations and to enable failure predictions.

Figure 9:
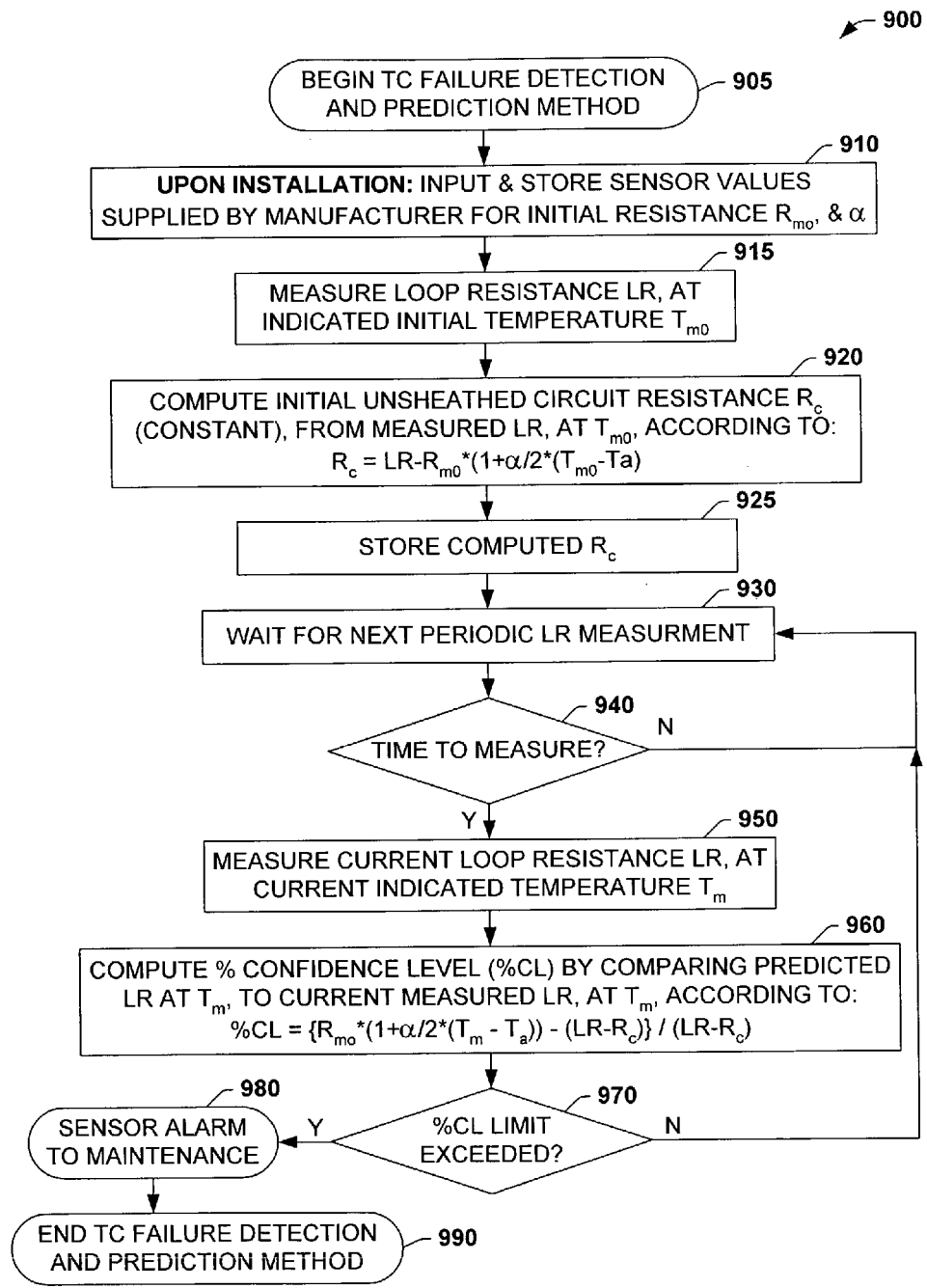
FIG. 9 is another flow chart diagram illustrating a method of detecting TC circuit degradations, and predicting failures in a TC degradation detection system in accordance with an aspect of the present invention.

Referring now to FIG. 9, an exemplary method 900 is illustrated for detecting TC circuit degradations, and predicting failures in a TC degradation detection system in accordance with another aspect of the present invention. Method 900 of FIG. 9 is similar in most regards to that of method 800 of FIG. 8, and as such need not be described again for the sake of brevity.

Method 900 of FIG. 9, in accordance with the TC degradation detection systems of FIGS. 6, 7 and 8, begins at 905, and continues in methods 910 and 915 that are similar to that of method 800 up thru 820 that is similar to the $R_c$ computation at 920 and $R_c$ storage in memory at 925. In this aspect of the present invention, a time delay loop is added at 930, waiting for a next periodic loop resistance LR measurement, when a predetermined time has expired at 940. When the wait time delay has expired, a current loop resistance LR measurement is read at 950 at a current indicated temperature $T_m$, similar to that of 850 of FIG. 8. Thereafter method 900 of FIG. 9 continues in methods 960, 970 and 980, similar to that of method 800 of FIG. 8, until the failure detection and prediction method of the present invention ends at 990, for detecting TC circuit degradations, and predicting failures in a thermocouple monitoring system.

Figure 10:
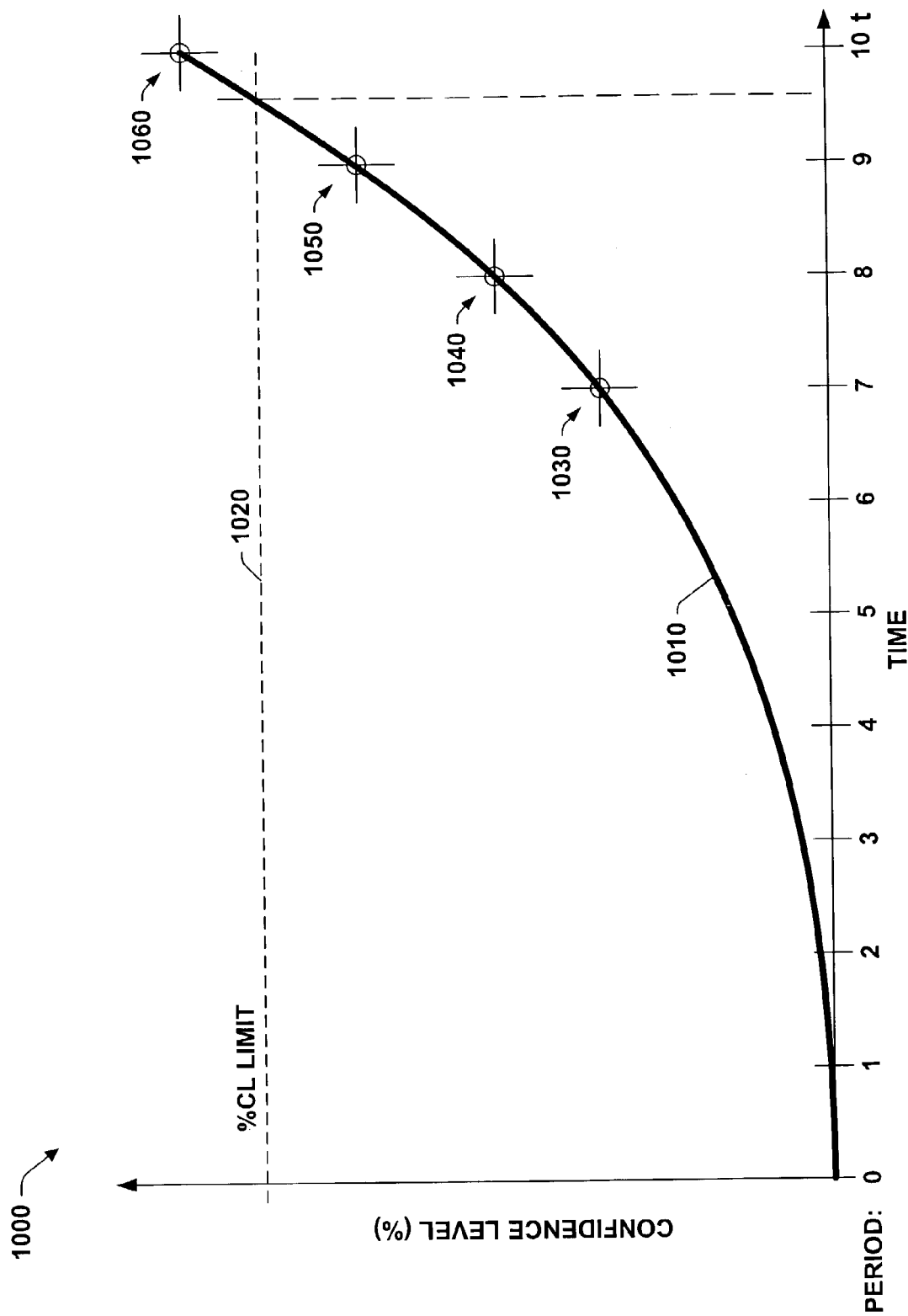
FIG. 10 is a simplified output plot of an exemplary TC degradation detection system similar to the systems of FIGS. 6 and 7, illustrating a change in the percentage of confidence level as a thermocouple circuit degrades to a confidence limit indicating a failure or alarm level in accordance with an aspect of the present invention.

FIG. 10 illustrates a simplified output plot 1000 of an exemplary TC degradation detection system similar to the systems of FIGS. 6 and 7 and in accordance with the methods of FIGS. 8 and 9. Plot 1000 shows a curve 1010 of a typical change in the percentage of confidence level as a thermocouple circuit degrades over time up toward a predetermined confidence limit 1020 indicating a failure or alarm level in accordance with an aspect of the present invention. Uniform or fixed periods of time may be utilized for making the loop resistance measurements (e.g., 1030, 1040, 1050, and 1060) used in the algorithm discussed above to create a time-series history model of the thermocouple confidence levels for predicting variables relating to confidence level and an impending thermocouple failure at a next loop resistance measurement. For example, a curve could be modeled based on historical % CL data points 1030–1050 at periods 7–9, to predict that a next data point 1060 at period 10 will exceed a failure mode limit for the TC measured.

Figure 11:
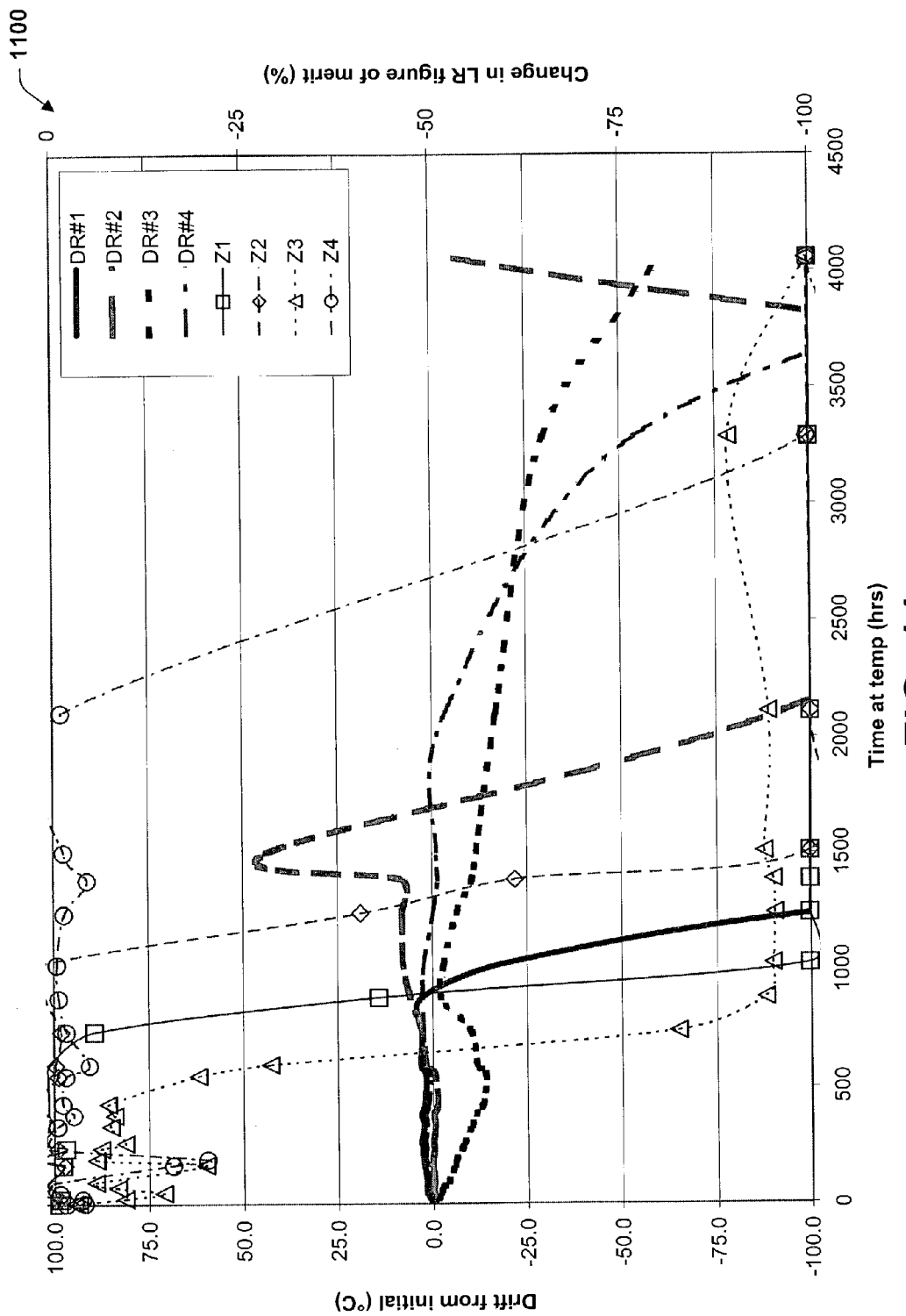
FIG. 11 is a plot of the changes in several TCs illustrating a drift (DR#1–4) over time and temperature, and an associated change in figure of merit (Z1–4) as detected by the exemplary TC degradation detection system similar to the systems of FIGS. 6 and 7, and as computed by the algorithm of the present invention.

FIG. 11 illustrates a plot 1100 of the changes in several TCs with a drift (DR#1–4) over time at a temperature, and a corresponding change in figure of merit (Z1–4) as detected by the exemplary TC degradation detection system similar to the systems of FIGS. 6 and 7 and in accordance with the methods of FIGS. 8 and 9, and a variation of the algorithm of the present invention. In particular, the Z figure of merit curves are generated using, for example, an inverted form of the % CL algorithm of the present invention (e.g., 1/(% CL)). Plot 1100 further demonstrates that the Z figure of merit variable provides enhanced resolution and more accuracy in identifying TC and TC circuit degradation than simply a macroscopic loop resistance measurement. In addition, comparing, for example, drift curves DR#1 and DR#2 to those of the Z figure of merit curves Z1 and Z2, respectively, illustrates that the Z figure of merit also appears to beneficially respond sooner in the time domain than that of the thermocouple drift. As with the % CL limit predetermined to indicate a level of degradation associated with a failure or alarm level, the Z figure of merit may also be assigned a predetermined limit corresponding to a failure or alarm level in accordance with another aspect of the invention.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A method of detecting thermocouple failure in a temperature monitoring circuit, the method comprising:

inputting and storing manufacturers values for an initial resistance $R_{mo}$ and a temperature coefficient of resistance α for a thermocouple based on the thermocouple part number;

measuring a loop resistance LR at an indicated initial temperature $T_{mo}$;

computing and storing an initial circuit resistance $R_c$ of the unsheathed portion of the temperature monitoring circuit, based on the LR measurement and initial temperature $T_{mo}$;

measuring a current loop resistance LR at a current indicated temperature $T_m$;

computing a thermocouple confidence level % CL based on comparing a predicted LR, to the current measured LR at the current indicated temperature $T_m$ according to a thermocouple failure detection algorithm;

determining whether the thermocouple confidence level % CL has exceeded a predetermined limit;

measuring another current loop resistance LR at the current indicated temperature $T_m$, if the % CL has not exceeded the predetermined limit;

generating an alarm for maintenance of the thermocouple, if the % CL has exceeded the predetermined limit; and wherein the limit of the thermocouple confidence level corresponds to an impending thermocouple failure and the prediction thereof.

2. The method of claim 1, further comprising waiting for a time to make the current measurement of the loop resistance LR at the current indicated temperature $T_m$.

3. The method of claim 2, wherein the waiting for a time to make the current measurement of the loop resistance LR at the current indicated temperature $T_m$, comprises waiting for a periodic time to make the measurement.

4. The method of claim 1, further comprising waiting for a time to make another current measurement of the loop resistance LR at the current indicated temperature $T_m$, if the % CL has not exceeded the predetermined limit.

5. The method of claim 1, wherein the computing and storing an initial circuit resistance $R_c$ of the unsheathed portion of the temperature monitoring circuit, based on the LR measurement and initial temperature $T_{mo}$ is represented by $R_c = LR - R_{mo}*(1+\alpha/2*(T_{m0}-T_a))$ where $R_{mo}$ is the initial resistance of the sheathed portion of the thermocouple, α is the temperature coefficient of resistance of the thermocouple, LR is the measured loop resistance of the thermocouple monitoring circuit measured at the initial indicated temperature $T_{m0}$ with the unsheathed portion of the circuit at an ambient temperature $T_a$.

6. The method of claim 5, wherein the thermocouple sheathed portion values $R_{mo}$, and α are supplied by the manufacturer of the thermocouple.

7. The method of claim 5, wherein the thermocouple sheathed portion values $R_{mo}$, α and $T_{m0}$ are supplied by the manufacturer of the thermocouple.

8. The method of claim 1, wherein the computing of the thermocouple confidence level % CL in accordance with the thermocouple failure detection algorithm is represented by % CL={$R_{mo}*(1+\alpha/2*(T_m-T_a))-(LR-R_c)$}/(LR-$R_c$) where $R_{mo}$ is the initial resistance of the sheathed portion of the thermocouple, α is the temperature coefficient of resistance of the thermocouple, LR is the measured loop resistance of the thermocouple monitoring circuit measured at the current indicated temperature $T_m$ with the unsheathed portion of the circuit at an ambient temperature $T_a$.

9. The method of claim 1, further comprising creating a time-series history model of the thermocouple confidence levels for predicting variables relating to confidence level and thermocouple failure at a next loop resistance measurement.

10. A system for detecting thermocouple failure comprising a computer coupled to a thermocouple by no more than the two leads of the thermocouple and configured to perform the method of claim 1.

11. A method of detecting thermocouple failure in a temperature monitoring circuit, the method comprising:

inputting and storing manufacturers values for an initial resistance $R_{m0}$ and a temperature coefficient of resistance α for a thermocouple based on the thermocouple part number;

measuring a loop resistance LR at an indicated initial temperature $T_{mo}$;

computing and storing an initial circuit resistance $R_c$ of the unsheathed portion of the temperature monitoring circuit, based on the LR measurement and initial temperature $T_{m0}$;

measuring a current loop resistance LR at a current indicated temperature $T_m$;

computing a thermocouple figure of merit Z based on comparing a predicted LR, to the current measured LR at the current indicated temperature $T_m$ according to a thermocouple failure detection algorithm;

determining whether the thermocouple figure of merit Z has exceeded a predetermined limit;

measuring another current loop resistance LR at the current indicated temperature $T_m$, if the Z has not exceeded the predetermined limit;

generating an alarm for maintenance of the thermocouple, if the Z has exceeded the predetermined limit; and wherein the limit of the thermocouple figure of merit Z corresponds to an impending thermocouple failure and the prediction thereof.

12. The method of claim 11, further comprising waiting for a time to make the current measurement of the loop resistance LR at the current indicated temperature $T_m$.

13. The method of claim 12, wherein the waiting for a time to make the current measurement of the loop resistance LR at the current indicated temperature $T_m$, comprises waiting for a periodic time to make the measurement.

14. The method of claim 11, further comprising waiting for a time to make another current measurement of the loop resistance LR at the current indicated temperature $T_m$, if the Z has not exceeded the predetermined limit.

15. The method of claim 11, wherein the computing and storing an initial circuit resistance $R_c$ of the unsheathed portion of the temperature monitoring circuit, based on the LR measurement and initial temperature $T_{mo}$ is represented by $R_c = LR - R_{m0} *(1+\alpha/2*(T_{mo}-T_a))$ where $R_{mo}$ is the initial resistance of the sheathed portion of the thermocouple, $\alpha$ is the temperature coefficient of resistance of the thermocouple, LR is the measured loop resistance of the thermocouple monitoring circuit measured at the initial indicated temperature $T_{m0}$ with the unsheathed portion of the circuit at an ambient temperature $T_a$.

16. The method of claim 15, wherein the thermocouple sheathed portion values $R_{mo}$, and $\alpha$ are supplied by the manufacturer of the thermocouple.

17. The method of claim 15, wherein the thermocouple sheathed portion values $R_{mo}$, $\alpha$, and $T_{mo}$ are supplied by the manufacturer of the thermocouple.

18. The method of claim 11, wherein the computing of the thermocouple figure of merit Z in accordance with the thermocouple failure detection algorithm is represented by $Z=1/\{R_{mo}*(1+\alpha/2*(T_m-T_a))-(LR-R_c)\}/(LR-R_c)$ where $R_{mo}$ is the initial resistance of the sheathed portion of the thermocouple, $\alpha$ is the temperature coefficient of resistance of the thermocouple, LR is the measured loop resistance of the thermocouple monitoring circuit measured at the current indicated temperature $T_m$ with the unsheathed portion of the circuit at an ambient temperature $T_a$.

19. The method of claim 11, further comprising creating a time-series history model of the thermocouple figure of merit Z values for predicting variables relating to the figure of merit Z and the thermocouple failure at a next loop resistance measurement.

20. A system for detecting thermocouple failure comprising a computer coupled to a thermocouple by no more than the two leads of the thermocouple and configured to perform the method of claim 11.

21. A system for detecting thermocouple failure, comprising:

a temperature measuring component having one or more thermocouples coupled thereto wherein the coupling to each thermocouple is by no more than the two thermocouple leads;

a memory storage component;

an analyzer operably coupled to the temperature measuring component and the storage component, the analyzer having a prediction algorithm used by the analyzer to detect thermocouple degradations and to make thermocouple failure predictions;

wherein temperature signals generated by respective thermocouples are provided to the analyzer over the no more than two thermocouple leads and utilized within the prediction algorithm within the analyzer to generate the thermocouple degradation detection, the level of which provides one of an indication of thermocouple health and an indication of imminent thermocouple failure; and wherein the prediction algorithm is performed by the analyzer and conveyed by a computer readable medium.

22. The system of claim 21, wherein the temperature measuring component is operable to monitor one or more thermocouples and the loop resistance of a thermocouple monitoring circuit, and forward the results to the analyzer.

23. The system of claim 21, wherein the analyzer is operable to receive one or more thermocouple parametric inputs provided by the manufacturer, and the results of the temperature measuring component.

24. The system of claim 23, wherein the analyzer is further operable to analyze the results of the temperature monitor component, and use the algorithm together with the thermocouple parametric inputs to compute and store the unsheathed constant resistance $R_c$ to the memory storage component.

25. The system of claim 24, wherein the analyzer is further operable to direct the measurement component to make additional loop resistance measurements of each thermocouple and to analyze and determine using the failure detection algorithm, the confidence level of the thermocouple, make a failure prediction of the thermocouple, and issue an alarm condition if a predetermined limit has been achieved.

26. The system of claim 21, wherein the thermocouple degradation detection indication generated by the prediction algorithm is based on a measurement of the loop resistance of a thermocouple monitoring circuit having no more wires than correspond to the two leads of the thermocouple.

27. The system of claim 21, wherein the thermocouple degradation detection indication generated by the prediction algorithm is based on a measurement of the loop resistance of a thermocouple monitoring circuit having no more wires than correspond to the two leads of the thermocouple and an indicated temperature.

28. A system for detecting thermocouple failure, comprising:

one or more thermocouples to monitor temperature within the system; and a computer coupled to the one or more thermocouples, said coupling to each thermocouple being by no more than the two leads of the thermocouple;

wherein temperature signals generated by respective thermocouples are provided to the computer over the no more than two thermocouple leads and utilized within a prediction algorithm that is embedded within the computer to generate a thermocouple confidence level % CL, which level provides one of an indication of thermocouple health and an indication of imminent thermocouple failure;

wherein the prediction algorithm is performed by the computer and conveyed by a computer readable medium.

29. The prediction algorithm of claim 28, wherein the thermocouple confidence level % CL indication generated by the prediction algorithm is based on measurement of the loop resistance of a thermocouple monitoring circuit.

30. The prediction algorithm of claim 28, wherein the thermocouple confidence level % CL indication generated by the prediction algorithm is based on measurement of the loop resistance of a thermocouple monitoring circuit and an indicated temperature.

31. The system of claim 28, wherein the thermocouple confidence level % CL is assigned a predetermined confidence level limit corresponding to a thermocouple failure and the prediction thereof.

32. The system of claim 28 wherein the prediction algorithm further determines a thermocouple figure of merit Z as a function of the thermocouple confidence level % CL and wherein the computer is configured to compare the thermocouple figure of merit Z to a predetermined limit and initiate an action when the determined thermocouple figure of merit Z exceeds the predetermined limit.

33. A system for detecting thermocouple failure, comprising:

one or more thermocouples to monitor temperature within the system;

an input for receiving manufacturers values for an initial resistance $R_{m0}$ and a temperature coefficient of resistance $\alpha$ for each thermocouple based on the thermocouple part number for each:

a memory for storing the received manufacturers values for the initial resistance $R_{m0}$ and the temperature coefficient of resistance $\alpha$; and a computer coupled to the one or more thermocouples, said coupling to each thermocouple being by no more than the two leads of the thermocouple, said computer configured to compute and store in the memory an initial loop resistance of the thermocouple;

wherein temperature signals generated by respective thermocouples and provided by the no more than two thermocouple leads are provided to the computer and utilized to measure an initial loop resistance at an indicated initial temperature and a current loop resistance at a current indicated temperature, and a prediction algorithm that is embedded within the computer to generate a thermocouple figure of merit Z based on comparing a predicted loop resistance to the current measured loop resistance according to a thermocouple failure detection algorithm;

wherein the prediction algorithm is performed by the computer and conveyed by a computer readable medium, wherein the computer is configured to compare the thermocouple figure of merit Z to a predetermined limit and generate an alarm for maintenance when the determined thermocouple figure of merit Z exceeds the predetermined limit, and wherein the limit of the thermocouple figure of merit Z corresponds to an impending thermocouple failure and the prediction thereof.

* * * * *